(Model.)

4 Sheets—Sheet 1.

T. R. MORGAN.
Drilling Machine.

No. 238,244. Patented March 1, 1881.

Witnesses
A. W. Bright
A. L. Lawrence

Inventor Thos. R. Morgan
By H. A. Supnom (Model.) 4 Sheets—Sheet 2.

T. R. MORGAN.
Drilling Machine.

No. 238,244. Patented March 1, 1881.

(Model.)
T. R. MORGAN.
Drilling Machine.
No. 238,244.                    Patented March 1, 1881.
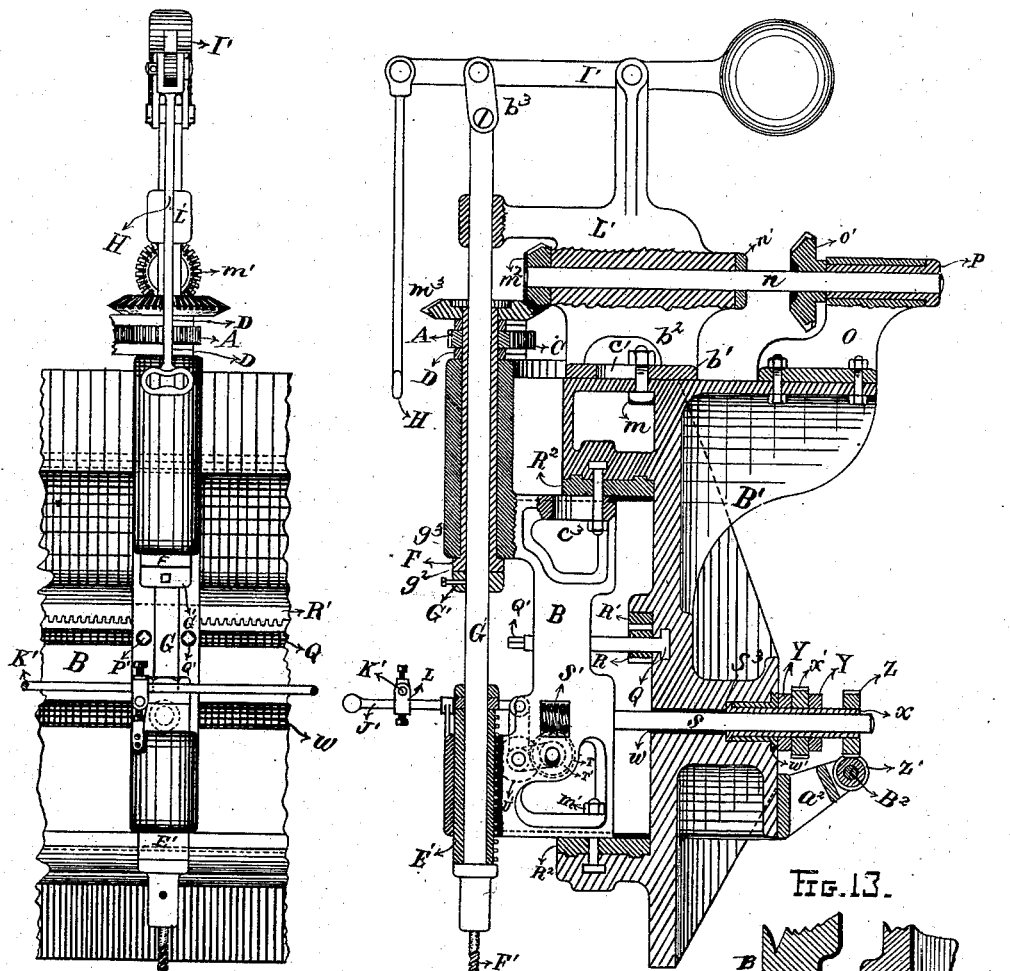
Fig.3.    Fig.4.    Fig.13.
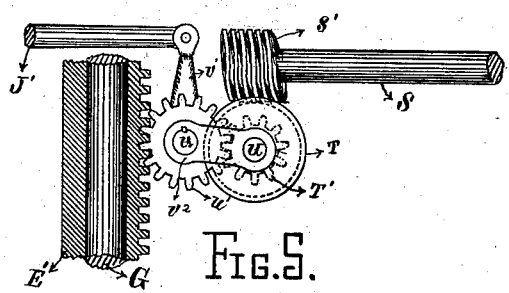   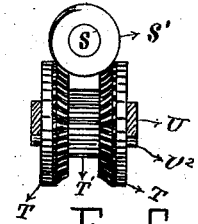
Fig.5.    Fig.6.
Witnesses                    Inventor (Model.)

T. R. MORGAN.
Drilling Machine.

No. 238,244. Patented March 1, 1881.

Witnesses
Inventor Thos. R. Morgan.

UNITED STATES PATENT OFFICE.

THOMAS R. MORGAN, OF ALLIANCE, OHIO.

DRILLING-MACHINE.

SPECIFICATION forming part of Letters Patent No. 238,244, dated March 1, 1881.

Application filed July 12, 1880. (Model.)

*To all whom it may concern:*

Be it known that I, THOMAS R. MORGAN, of Alliance, in the county of Stark and State of Ohio, have invented certain new and useful Improvements in Multiple Drilling-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in multiple drilling-machines, the object being to provide a machine of such construction that a number of holes in or out of line, or on a curve, or at equal or unequal distances apart, may be drilled simultaneously in boiler-plates, ship-plates, bridge-work, or any other class of work in iron, steel, or other metals.

In the manufacture of sheet and plate metals, such as iron and steel, into steam-boilers, tanks, bridges, and ship-work, &c., the lines of rivet-holes are sometimes required to be made straight in a single line for one row of rivets, sometimes on a curve, and again in two lines running parallel with each other, but the holes of the different lines or series at an angle, and alternating or crosswise with each other for a double row of rivets, and sometimes to varying curves, and the holes made at varying distances from each other, both in the single and double lines or rows of rivets. It is necessary that the holes should be drilled with the greatest accuracy of position, so that when the joints are put together the rivet-holes will exactly register with each other, and hence the rivets will not be liable to become sheared off and impaired in strength when driven in place, as results when the holes do not come exactly opposite and register with each other; and, also, it is desirable to perform not only perfectly accurate work, but to execute it with rapidity and simplicity of operation, and to dispense with templets for laying off the work.

To these ends my invention consists in certain details of construction and combinations of parts in a multiple drilling-machine, as will hereinafter be described, and pointed out in the claims.

Figure 1:
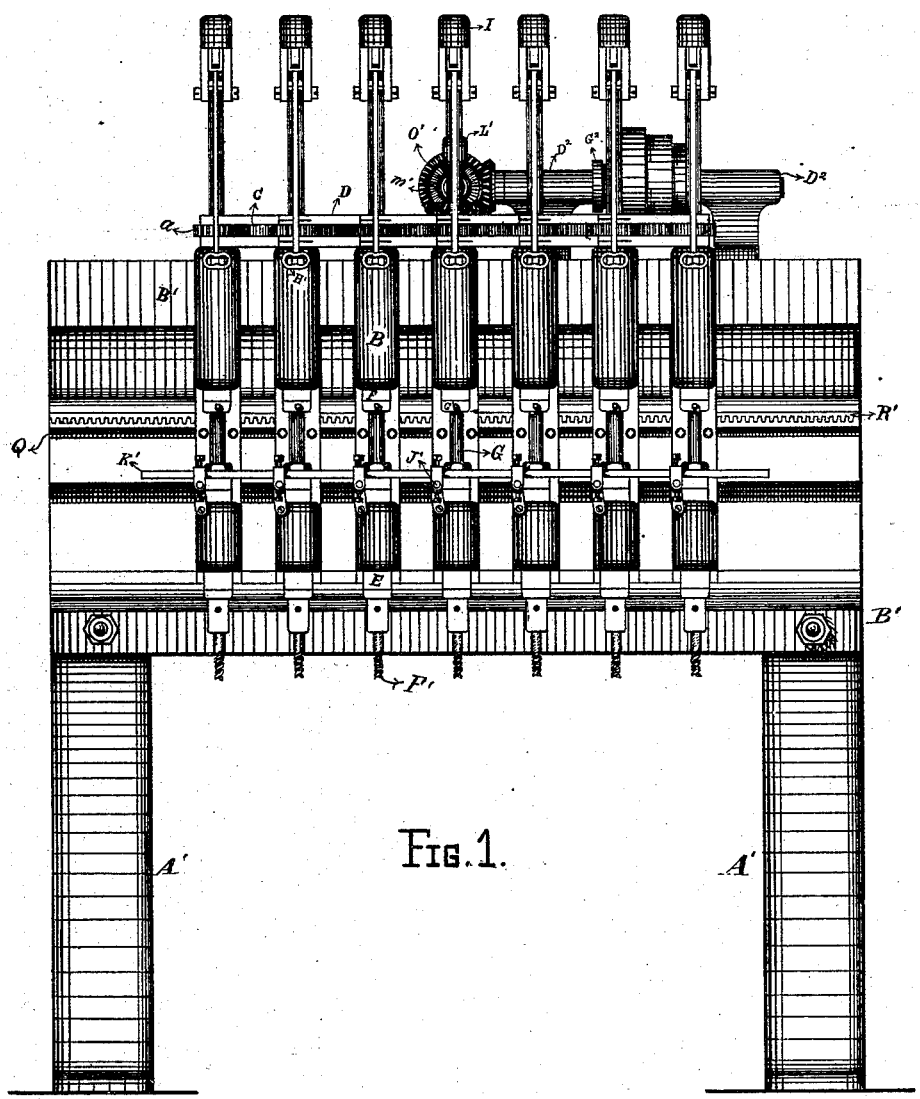
Figure 2:
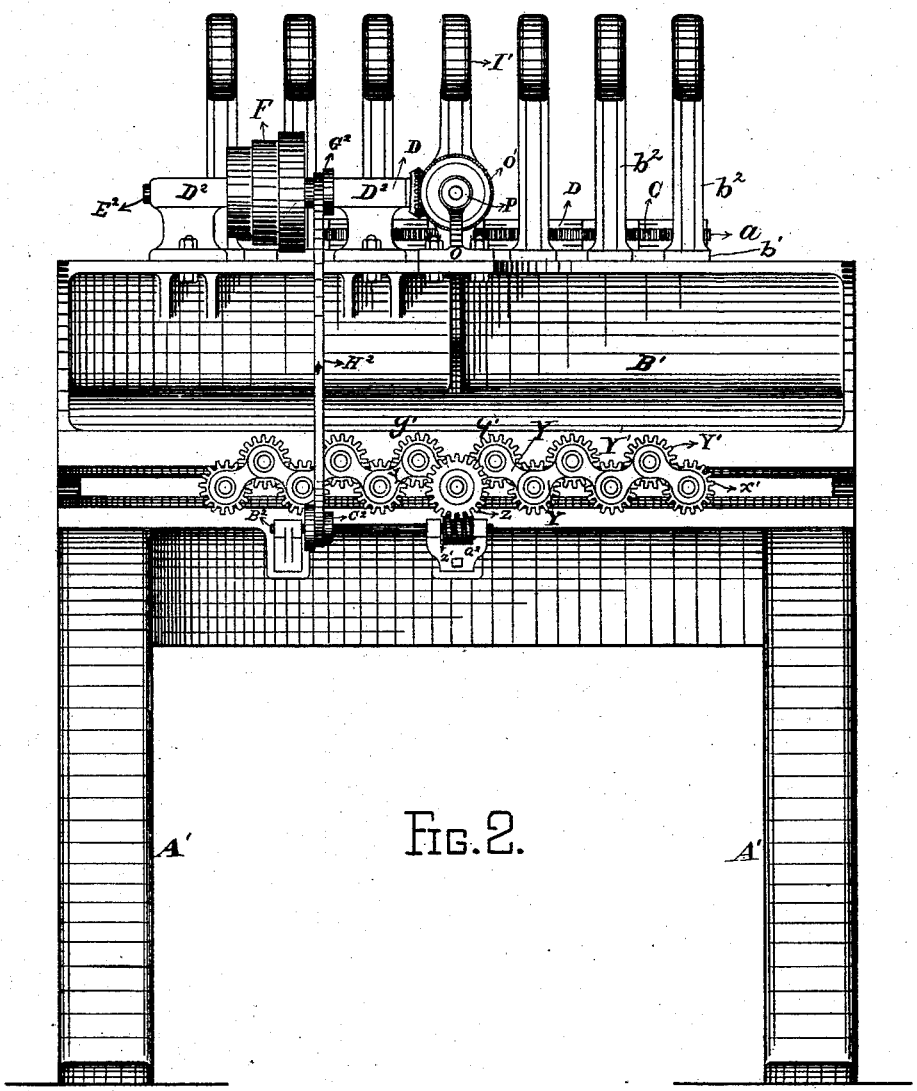
Figure 12:
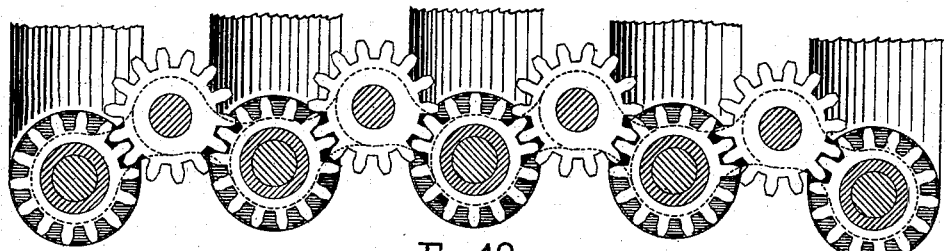
Figure 11:
Figure 10:
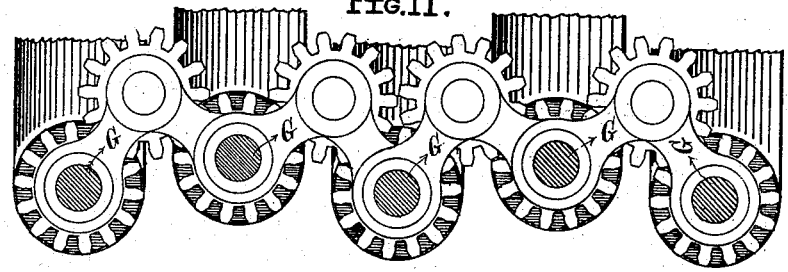
Figure 9:
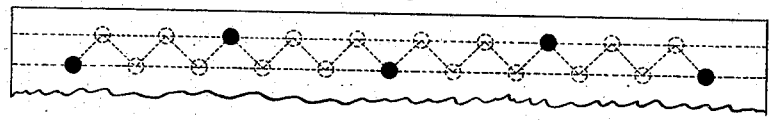
Figure 8:
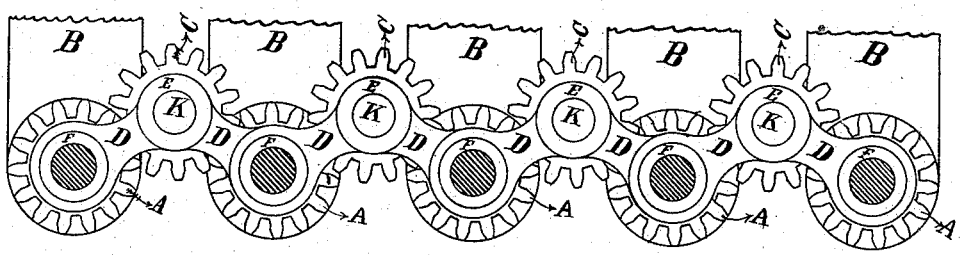
Figure 7:
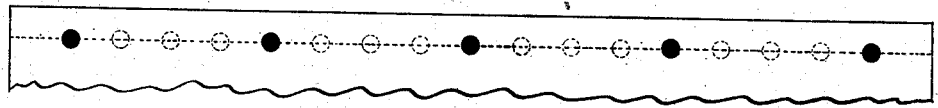

In the accompanying drawings, Figure 1 is a front elevation of my improved multiple drilling-machine. Fig. 2 is a rear elevation of the same. Fig. 3 is an enlarged view, in front elevation, of one of the drills and drill-carrier. Fig. 4 is a view, part side elevation and partly in vertical section, representing the driving and feeding mechanism of the middle drill, from the gearing of which all the other drills receive their motion. Fig. 5 is an enlarged detached view, partly in side elevation and partly in vertical section, of the mechanism for feeding the drill in its vertical movement. Fig. 6 is a front view of a portion of the feed mechanism shown in Fig. 5. Fig. 7 is a plan view of a portion of a boiler-plate with holes drilled therein on a single straight line, the holes being at equal distances apart. Fig. 8 is a plan view of the drills and gearing adjusted to drill the holes on a single straight line. Fig. 9 is a plan view of a portion of a boiler-plate having two lines of holes drilled at equal distances apart and on a zigzag course. Fig. 10 is a plan view of the drills and gearing adjusted to drill on a zigzag or on two parallel lines, as represented in Fig. 8. Fig. 11 is a plan view of a portion of a boiler-plate with holes drilled on a curve and at equal distances apart. Fig. 12 is a plan view of the drills and gearing adjusted to drill the holes on a curved line. Fig. 13 is an enlarged view for showing the screw for adjusting the drill-carriers toward or from the cross-head B'.

A' represents the standards of the frame of the machine, to the upper ends of which is secured the cross-head B', which latter supports the drills and operating mechanism. Beneath the cross-head is placed a table, upon which the work is supported, said table not being shown in the drawings, but it may be of any preferred form and size.

B represents one of the drill-carriers which serve to carry the drill-spindles G and mechanism connected therewith. Drill-carriers B are provided with rearwardly-projecting arms or plates or guides $b'$, which rest upon the top of the cross-head B', to which plates the standards $b^2$ are secured, or cast solid therewith.

To the upper ends of the drill-spindles are attached, by stirrups $b^3$, the weighted levers I', which serve to balance the spindles and retain them against the feed-gear and prevent the drills from breaking. Also, the weighted levers serve to raise the drills from the face of the plate being drilled, and prevent the drills from tearing the metal when passing through the plate. Again, the weighted levers serve to release the feed-gear and impart a prompt and positive upward movement of the drills. The forward ends of the weighted levers I' are furnished with handles H for depressing the spindles and drills.

The drill-carriers are constructed as follows, to allow of the adjustment of the drills toward or from the cross-head or at right angles to the latter.

The middle drill-carrier is constructed with an elongated slot, $c'$, in its topmost transverse plate, through which is inserted the clamping-bolt $m$, the latter serving to hold the bracket firmly in any desired transverse adjustment. Drill-carriers B are further provided with separate or detachable top and bottom plates, $R^2$, provided with grooves or projections, which fit corresponding longitudinal grooves or projections in the cross-head, whereby the top and bottom plates, $R^2$, are allowed to slide longitudinally in either direction on the upper and lower faces of the cross-head. The drill-carriers B are provided with elongated slots $c^3$, through which are inserted the bolts $m'$, for securing the drill-carrier to the top and bottom plates, $R^2$. The heads of the bolts $m'$ are located in the T-shaped groove in the cross-head, and thus by this arrangement and construction of parts the drill-carriers may be readily adjusted either longitudinally or transversely of the cross-head. To facilitate this adjustment the top and bottom plates, $R^2$, and adjacent face of the cross-head may be furnished with indicating or graduated plates, thereby enabling the drills to be readily adjusted to any desired measurement.

The following means are provided for moving and adjusting the drill-carriers B, either longitudinally or transversely, to adjust the drills to drill on a straight line, zigzag line, or curve. In the drill-head (see Figs. 3 and 13) is inserted a screw, P', the rear end of which is furnished with a collar, $p^2$, which fits in a dovetail or T-groove, Q, in the cross-head. The outer or front end of the screw P' is squared or made in any angular form for the attachment of a wrench or movable lever. By turning the screw in one direction the drill-carrier will be moved toward the cross-head, the bolts which secure the drill-carrier to the cross-head having first been loosened to allow of such adjustment; and by turning the screw in the opposite direction the drill-carrier is moved away from the cross-head.

The lateral adjustment of the drill-carriers is effected as follows: Through the drill-carrier is inserted a shaft, Q', the rear end of which is furnished with a pinion, R, which gears with a rack, R', attached to the cross-head. The forward end of the shaft Q' is squared, or made of other angular form, for the attachment of a wrench or movable lever. By turning the shaft Q' in one direction the drill-carrier is moved laterally in one direction, and an opposite revolution of the shaft will adjust the drill-carrier in the reverse direction.

The middle drill-spindle is driven by gearing hereinafter described, and serves to impart motion to all the other drills.

Bracket L' of the middle drill-carrier (see Fig. 4) serves as a bearing for the intermediate shaft $n$, to the forward end of which is secured a bevel-gear wheel, $m^2$, which gears with the bevel-wheel $m^3$ on the middle drill-spindle.

$n'$ is a collar placed on the intermediate shaft $n$, close to the guide-bracket L'. The rear end of shaft $n$ is supported in a stationary bracket, $o$, within which is placed a sleeved bevel-wheel, $o'$, which is retained against longitudinal displacement by means of the bracket $o$, which forms a bearing for the rear face of the bevel-wheel and the collar P on the sleeve. Pinion or bevel-wheel $o'$ is furnished with a spline which fits in a corresponding groove in shaft $n$. Hence, the bevel-wheel $o'$ being revolved, motion is imparted to the shaft $n$, and as the latter is free to be moved lengthwise the guide-bracket L' and drill-carrier may be moved backward or forward without affecting the driving-gear.

G represents the drill-spindle, and F a sleeve or bushing surrounding the same, the lower end thereof being furnished with a collar, $g^2$, which rests against the lower end of the bracket-bearing $g^3$.

To the upper end of bushing F is keyed fast a bevel-wheel, $m^3$, which gears with bevel-wheel $m^2$ on intermediate driving-shaft $n$. The bevel-wheel $m^3$ is furnished with a spline which engages in a corresponding groove in the drill-spindle G, thereby allowing the latter to be freely reciprocated, while being revolved at the same time.

To the bushing F is rigidly keyed, or otherwise secured, a gear-wheel, A, which meshes with, and imparts motion to, intermediate gear-wheels, C.

D are links provided with eyes or bearings at opposite ends. The links at one end surround bushings F, and at their opposite ends are connected to one another by pins K, which serve at the same time as journal-bearings for the intermediate gear-wheels, C. Collars E are secured to the pins K to increase the bearing of the latter, and serve to stiffen and strengthen the connecting parts.

By means of the gear-wheels A, attached to the bushings F on the drill-spindles, the intermediate gears, C, are retained in gear with gear-wheels A, under all adjustments, on their pitch-lines by means of the link-connections. Hence the several drill-spindles and drill-carriers may be adjusted toward or from each other, at equal or varying distances apart, without affecting the driving-gear in the least, as the gears are always maintained in perfect mesh with each other, as heretofore explained.

The lower ends or portions of the drill-carriers are furnished with drill-feeding mechanism, as follows:

E' is a sleeve-rack fitting in the lower portion of the drill-carrier and surrounding the lower end of the spindle, the latter having drill F' secured to its lower end.

S represents the shaft for effecting the downward feed of the drill. Shaft S is journaled at one end in the drill-carrier, and has a worm, S', keyed thereto. The worm S' meshes with the two beveled wheels T, between which, and fastened to them, is a gear-wheel, T', as shown in Fig. 6, all of which revolve loosely on, or may be keyed to, shaft U.

U' is another gear-wheel, meshing into gear-wheel T' and into sleeve-rack E'. Gear-wheel U' is arranged to revolve loosely on its shaft V.

V' is a bell-crank lever keyed fast to one end of the shaft V, the horizontal arm of which supports the bearing for one end of shaft U. The opposite ends of shafts U V are connected by a strap, which is keyed to shaft V only to preserve the gear-wheels in gear and support the shafts thereof. The opening in the drill-carrier B, through which passes the shaft U, is made oblong and on a curve, the radius being struck from the center of the shaft U, allowing a downward movement of said shaft, so that the bevel-wheels T and worm-wheel may be engaged and disengaged at will.

It will be observed that when the upper end of bell-crank lever V' is forced toward the worm S', or toward the cross-head, the bevel-wheels T are depressed or moved downwardly and out of engagement with the worm-wheel, and in this position of the feeding mechanism the sleeve-rack is free to be raised, carrying with it the drill-spindle and drill, the same being raised by means of the weighted lever connected to the upper end of the drill-spindle.

To the upper end of the bell-crank lever or rod $v'$ is pivoted the rod J', which extends forward in front of the drill-carriers. The outer ends of rods J' (each drill-carrier being provided with one of said rods and also the feed mechanism above described) are connected, by brackets L and set-bolts, with a rod, K', running horizontally in front of the machine, said rod K' being held in position to hold the feed mechanism in or out of gear by a suitable catch connected with the middle drill-carrier; hence, by pulling the rod K' forward and securing it in place by means of the catch, the feed mechanisms connected with the several drill-spindles of the machine are immediately put in operation, and they continue to operate until the catch is released and the rod K' forced toward the machine, or cross-head thereof, when the feed mechanisms will be immediately disengaged, and the drill-spindles will be promptly raised by the weighted levers connected with their upper ends.

Drill-spindles G are furnished with loose collars G', each provided with a set-bolt, whereby it (the collar) may be adjustably secured to the drill-spindle. Collars G' are adjusted to the required height on the drill-spindles to allow the drills in their upward movement to rise a sufficient distance to clear the face of the plates that are being drilled, and be in readiness for the next operation of drilling.

The feed-shaft S extends from the drill-carrier rearwardly through the slot $w$ in the cross-head, which slot is of dovetail or other angular form, to allow the journal-bearing $w'$ to be adjusted laterally or at right angles to shaft S. Within the bearing $w'$ is placed a revolving bushing, $x$, which is provided with a collar, $s^3$, to prevent its longitudinal displacement in one direction. Bushing $x$ is provided with a spline, which fits into a corresponding groove in the feed-shaft S. Thus it will be observed that the feed-shaft S may be readily moved both laterally in its bearing $w'$ and longitudinally in its revolving bushing $x$.

Driving gear-wheel $x'$ is securely keyed to bushing $x$ and embraces the bushing. On opposite sides of the driving gear-wheel $x'$ are links Y, the opposite ends of which support the intermediate gear-wheels Y', and thus operate to preserve contact of the several driving-gears attached to the bushings and the intermediate gear-wheels.

To the outer end of bushing $x$ is secured a toothed wheel, Z, which gears with a worm, Z', that is attached to shaft $B^2$, supported in brackets $a^2$, the latter being fastened to the rear side of the cross-head. From the foregoing it will be seen that when the shaft $B^2$ is revolved the worm Z' operates to revolve the toothed wheel Z, and the driving-wheel $x'$ being keyed onto the bushing surrounding the feed-shaft, the bushing is turned, and with it the feed-shaft, motion being transmitted to the several driving-gears $x'$, attached to the bushings, by means of the intermediate gear-wheels, which latter are always retained in mesh by the connecting links. Thus the feed-shafts, through which motion is imparted to the feeding mechanisms connected with the drill-spindles, are adapted to be adjusted either laterally at equal or varying distances from each other, and also longitudinally at equal or varying distances from the cross-head, without in anywise interfering with or affecting the continuous and positive action of the driving-gear.

To one end of the shaft $B^2$ is secured a cone-pulley, $C^2$. The first driving-shaft, $E^2$, is supported at opposite ends in brackets $D^2$, and to said shaft $E^2$ is secured a first driving-cone pulley, $F^2$, motion being imparted thereto through belting connecting with a pulley on a counter-shaft. The cone-pulley allows changes in the speed of the machine. To the shaft $E^2$ is also secured a cone-pulley, $G^2$, for driving the feed-pulley $C^2$ through belting $H^2$, thereby providing for changes of speed of the feed mechanism to suit the work to be done.

The several parts of the machine are adjusted for work as follows: The clamping-bolts for securing the drill-carriers in desired position are first loosened. Also, the set-bolt in the bracket L and the set-bolts in the loose collars G' on the spindles are loosened. The drills are now placed in their proper positions, at equal or varying distances from each other, either on a straight, curved, or zigzag line, by means of the adjusting-screw P' and rack and pinion R R'. The clamping-bolts should then be tightened. The handles H of each drill, in its turn, should then be taken hold of and the drill brought down, near the surface of the work, following which the collar G' should be set up against the collar $g^2$ of the sleeve F in the upper portion of the drill-carrier B, and all the set-bolts connected with said collars G' tightened to retain the collars against displacement on the drill-spindles. The bolts on the brackets L should then be tightened with the beveled wheels T, all out of gear. One movement outward of the rod K' will bring all the beveled wheels T into gear with worms S'. The machine is now put in operation, the drill-spindles and feed-gears all being put in motion, and the drills are fed downward until the holes are drilled to their proper depth. When this is done the operator releases the catch which holds the rod K' in place, and at the same time pushes the rod K' in toward the machine, which operates to disengage all the beveled wheels from the worms on the feed-shafts. The weighted levers I' will then promptly raise all the drill-spindles until collars G' come in contact with collars $g^2$ on sleeve F, ready for the next operation. The plate to be drilled is then moved onto stops placed on the machine, the rod K' pulled outwardly, which operates to throw all the feed-gears in operation again, and the holes again drilled, and thus the machine can at all times be kept running, or the plate can be carried on a dividing-table having straight or curvilinear movements in connection therewith.

It is evident that many slight changes may be made in details of construction and arrangement of parts without departing from the spirit of my invention, and hence I do not limit myself to the exact construction and arrangement of parts shown and described.

I am aware that multiple drilling-machines have been furnished with drill-carriers and drills constructed and adapted to be adjusted singly or together, backward and forward, and to the right and left, and hence I make no broad claim to a drilling-machine capable of being operated in such manner, as my invention consists in certain features of construction and combinations of parts, in a machine of this type, which are pointed out in the claims.

Having fully described my invention, what I claim as new, and desire to secure by Letters Patent, is—

1. In a multiple drilling-machine, the combination, with a cross-head, B', provided with T-slots running lengthwise of the cross-head, of drill-carriers B, provided with elongated slots, plates R², connected with the upper and lower surfaces of the bearing ends of said drill-carriers, and bolts extending through the plates and elongated slots in the drill-carrier, the heads of the bolts engaging in the T-slots of the cross-head, substantially as set forth.

2. The combination, with the cross-head B' and drill-carriers B, connected therewith by adjusting-bolts $m'$, the heads of which are located in T-grooves in the cross-head, of screws P', extending through the drill-carriers, the rear end of said screws provided with collars, which engage in a grooveway in the cross-head, on the forward ends thereof, with angular ends to allow of the attachment of a wrench or movable lever, substantially as set forth.

3. The combination, with the cross-head B', and drill-carriers B, connected therewith by adjusting-bolts $m'$, the heads of which are located in T-grooves in the cross-head, of shafts P', extending through the drill-carriers, and provided on their rear ends with pinions R, which gear with a rack, R', attached to the cross-head, substantially as set forth.

4. In a multiple drilling-machine, the combination, with the cross-head B' and drill-carriers B, of screw-shafts P' and pinions R, said screw-shafts extending through the drill-carriers for moving the same, either laterally or transversely with respect to the cross-head, substantially as set forth.

5. In a multiple drilling-machine, the combination, with the cross-head B', of the middle drill-carrier provided with a shaft-bracket, L', said drill-carrier, with its bracket, adapted to be adjusted toward and from the cross-head, substantially as set forth.

6. The combination, with a drill-carrier and guide or shaft-bracket, of a vertically-adjustable drill-spindle, a revolving non-adjustable bushing surrounding said spindle, a bevel-gear connected with the bushing, and a bevel-gear attached to the end of a sliding driving-shaft, which latter is supported in the shaft or guide-bracket of the drill-carrier, substantially as set forth.

7. The combination, with a vertically-adjustable drill-spindle, G, and revolving bushing F, the latter having a bevel-gear, $m^3$, rigidly secured thereto, of an intermediate driving-shaft supported in an adjustable bracket, L, at one end, and at its opposite end in a sleeved bevel-wheel, $o'$, journaled in a stationary bracket, substantially as set forth.

8. In a multiple drilling-machine, the combination, with drill-carriers B, adapted to be adjusted independently of each other at equal or varying distances apart, either parallel or at right angles to the cross-head B', of weighted arms I', pivoted to brackets L', connected with said drill-carriers B, said arms connected with the upper ends of the drill-spindles by stirrups $b^3$, and having handles H attached to their forward ends, substantially as set forth.

9. In a multiple drilling-machine, the combination, with a series of vertically-adjustable drill-spindles, G, of driving gear-wheels $m^3$, attached to revolving bushings F, surrounding said spindles, and connected therewith by spline and grooves, and intermediate gear-wheels held in engagement with the driving-gears by links D, or bars, substantially as set forth.

10. In a multiple drilling-machine, the combination, with the middle drill-spindle, G, and gearing $m^2$ $m^3$, for imparting motion thereto, of gear-wheels A, attached to bushings F, surrounding the drill-spindles, and intermediate gears journaled in links D, the ends of which are sleeved on the drill-spindle bushings, whereby the gear-wheels are kept in engagement irrespective of the adjustment of the drill-spindles, substantially as set forth.

11. The combination, with a series of vertically-adjustable drill-spindles, G, and gearing $m^2$ $m^3$, for imparting motion to all of said drill-spindles irrespective of their adjustment, of loose collars C', connected to the drill-spindles by set-bolts, to regulate the upward movement of the drills, substantially as set forth.

12. The combination, with a series of drill-carriers, B, adapted to be adjusted both laterally and transversely to the cross-head B' of the machine, of rack-bushings E', surrounding the drill-spindles, and the feed mechanism for moving the drill-spindles downwardly, substantially as set forth.

13. In a multiple drilling-machine, the combination, with rack-bushings E', surrounding the drill-spindles G, of worm-shafts S S', tangent-wheels T T, and gear-wheels T' $u'$, arranged so that the gear-wheels shall always remain in engagement with the rack-bushings, while the tangent-wheels may be thrown either in or out of engagement with the worm at will, substantially as set forth.

14. In a multiple drilling-machine, the combination, with a shaft, S, journaled at one end in the drill-carrier B, said shaft provided with a worm-gear, S', of a bell-crank lever, V', having a gear-wheel, $u'$, journaled at the juncture of the two arms of the lever, and tangent-wheels T at the outer end of said arm, substantially as set forth.

15. In a multiple drilling-machine, the combination, with a series of worm-shafts, S, and a series of rack-bushings, E', the latter connected with the drill-spindles G, of intervening gear and tangent wheels, S' T T' $u'$, adapted to be thrown in and out of gear simultaneously, substantially as set forth.

16. In a multiple drilling-machine, the combination, with a drill-spindle, G, and a worm-shaft, S, of intervening gear and beveled wheels S' T T' $u'$, mounted on separate shafts, adapted to be moved simultaneously, and retain the gear-wheel T' and rack-bushing E' in engagement at all times, and engage and disengage the beveled wheels T and worm-gear S', substantially as set forth.

17. In a multiple drilling-machine, the combination, with a series of worm-shafts, S, supported at one end in independently-adjustable drill-carriers B, a series of rack-bushings, E', connected with the drill-spindles G, and intervening gearing for engaging and disengaging the feed-gears $u'$ and worm-gears S', of rods J', extending forwardly from each drill-carrier B, and a connecting-rod, K', for operating the several rods J', and thus connecting or disconnecting gears $u'$ with all the drill-spindle racks E' simultaneously, substantially as set forth.

18. In a multiple drilling-machine, the combination, with sliding worm-shafts S, of laterally-adjustable bearings $w'$ and revolving bushings $x$, connected with worm-shafts by spline and groove, substantially as set forth.

19. In a multiple drilling-machine, the combination, with worm-shafts supported at their forward ends in drill-carriers B, adapted to be adjusted laterally and toward or from the cross-head, of laterally-adjustable bearings $w'$, fitting in grooves in the cross-head, and revolving bushings $x$, journaled in said bushings $w'$, and connected with said worm-shafts by spline and groove, substantially as set forth.

20. In a multiple drilling-machine, the combination, with a series of feed-shafts, S, their forward ends supported in drill-carriers B, adapted to be adjusted laterally in either direction and toward or from the cross-head of the machine, of bushings $x$, surrounding the rear ends of said shafts, and connected therewith by spline and groove, and driving-gears Z, secured to said bushings, and intermediate gears journaled in links, the ends of which are connected with said worm-shafts S, substantially as set forth.

21. In a multiple drilling-machine, the combination, with a series of vertically-adjustable drill-spindles, G, and drill-carriers B, adapted to be independently adjusted at equal or varying distances apart, either in line with or toward or from the cross-head of the machine, of a spindle-driving shaft, $n$, adapted to have endwise movement, and feed-operating shafts adapted to have endwise movement, substantially as set forth.

22. In a multiple drilling-machine, the combination, with a series of vertically-adjustable drill-spindles, G, and drill-carriers B, adapted to be independently adjusted either in line with or toward or from the cross-head of the machine, of driving-gears A $m^2$ $m^3$, and intermediate gears, C, attached to links D, connected with bushings F, surrounding the drill-spindles G, and connected therewith by splines and grooves, substantially as set forth.

23. In a multiple drilling-machine, the combination, with the middle drill-carrier, B, of a feed-shaft, S, its forward end supported in the middle drill-carrier, the latter being adapted to be adjusted toward or from the cross-head, a bushing, $x$, surrounding the rear end of said shaft and mounted in a laterally-adjustable bearing, $w'$, a driving-gear, $x'$, attached to said bushing, and operating to impart motion to the adjacent feed-shafts S through intermediate gear journaled in links the ends of which are mounted on bushings $x$ of said feed-shafts, and a toothed wheel, Z, and worm-gear Z', for driving said feed-shaft, substantially as set forth.

24. In a multiple drilling-machine, the combination, with a series of vertically-moving drill-spindles, G, a series of drill-carriers, B, adapted to be adjusted in line with or forward or from the cross-head B' of the machine, and a series of drill-feeding mechanism, of gearing for imparting motion to the drill-spindles from a single shaft and to the feed mechanism from a single shaft, substantially as set forth.

In testimony that I claim the foregoing I have hereunto set my hand this 25th day of June, 1880.

THOS. R. MORGAN.

Witnesses:
JAS. H. LANGE,
A. W. BRIGHT.